United States Patent Office 3,317,039
Patented May 2, 1967

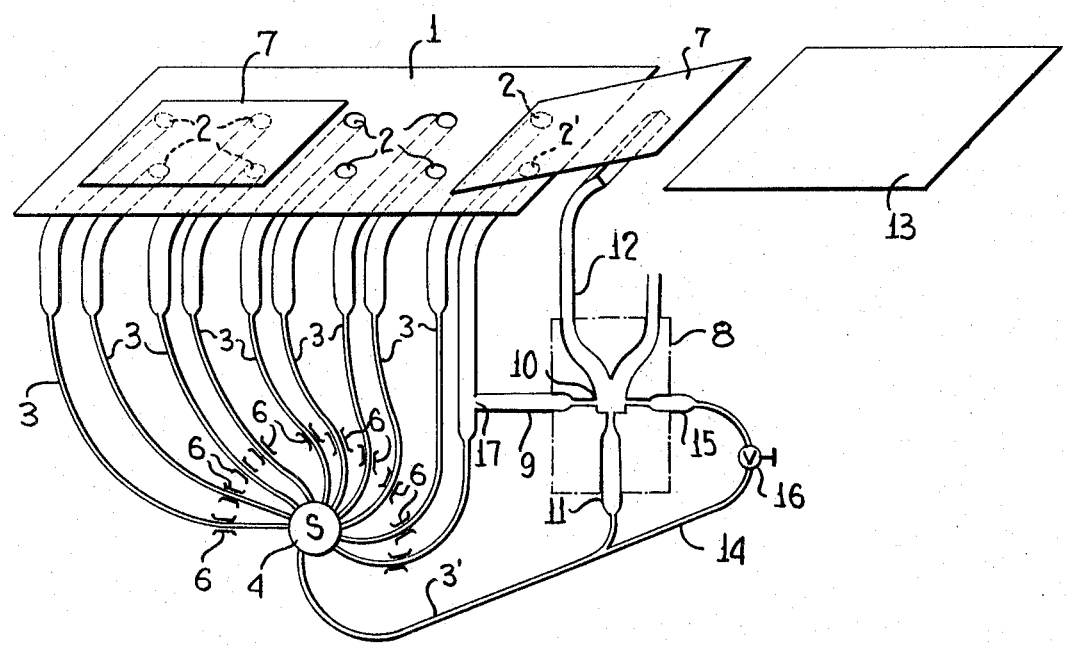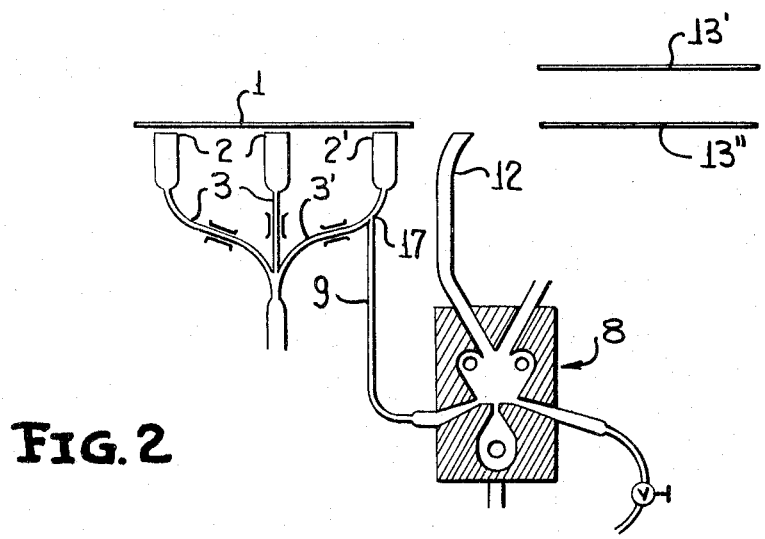

3,317,039
WEIGHING AND SORTING DEVICE
Walter G. Wadey, 7505 Holiday Terrace,
Bethesda, Md. 20034
Filed Feb. 25, 1965, Ser. No. 435,220
12 Claims. (Cl. 209—120)

The present invention relates to automatic letter weighers, and more particularly, to an automatic letter weigher capable of sorting letters in accordance with their weights without requiring moving parts in the sorting apparatus.

It is an object of the present invention to provide a letter or object weigher which employs no moving parts.

It is another object of the present invention to provide a letter or object weigher and sorter employing only pure fluid amplifiers for detecting the weight of individual letters or objects and sorting the letters into groups in accordance with the detected weight.

It is yet another object of the present invention to provide a weighing and sorting apparatus for material capable of sorting the material into two or more groups in accordance with the weight of the material relative to a predetermined weight or weights.

It is yet another object of the present invention to provide a letter weigher employing a pure fluid amplifier having an input system for determining whether the weight of a letter is above or below a predetermined standard and employing an output flow of a fluid amplifier to cause the letter to be deflected relative to a stationary divider, so as to be sorted into one or another group.

The above and still further objects, features and advantages of the present invention will become apparent upon consideration of the following detailed description of several specific embodiments thereof, especially when taken in conjunction with the accompanying drawings, wherein:

FIGURE 1 is a schematic diagram of an automatic letter weigher employing a single weighing station; and FIGURE 2 is a schematic diagram of an automatic letter weigher employing a weighing station capable of sorting the letters into at least three weight categories.

Referring specifically to FIGURE 1 of the accompanying drawings, there is provided a base plate 1 having a plurality of apertures 2 formed generally vertically, as illustrated in FIGURE 1, in the plate 1. In the illustrated embodiment, there are two apertures provided at each location transversely of the major axis of the plate 1 and five locations of apertures disposed along the length or major axis of the plate. It is not intended to be limited to any particular numbers or spacings of transversely or longitudinally arranged apertures, this being determined by the particular structural design of any particular embodiment of the device.

Each of the apertures 2 is returned via fluid passages 3 to a common source of fluid 4. Restriction 6 may be formed in each of the passages 4 in order to precisely control the amount of fluid, preferably though not necessarily air, egressing from each of the orifices 2. Letters or other sheet material to be sorted, generally designated by the reference numerals 7, are supplied from the left as illustrated in FIGURE 1 to the general region of the plate 1 and are adapted to be supported on the streams of air issuing from the orifices 2. In this connection, the longitudinal and transverse spacing between apertures 2 should be such that any letter is supported at all times by jets of air.

The streams of air issuing from the orifice 2 support the letters above the base plate 1, and if desired, the apertures 2 may be inclined upwardly and to the right in the plate 1. The streams of air may be directed towards the right so as to convey the letters to the right as well as support them. Other means of conveyance may be provided, such as air jets blowing from the left end of the plate towards the right end.

The weighing function of the apparatus of the present invention is performed by a fluid amplifier 8 in conjunction with one or more of the orifice passages 3. To differentiate this single orifice 2 and passage 3 from the other orifices and passages, they are designated by reference numerals 2' and 3' in FIGURE 1. The passage 3' is connected at junction 17 by a further passage 9 to a control input nozzle 10 of the fluid amplifier 8. The power nozzle of the fluid amplifier 8 is supplied from the fluid source 4 through a passage 11. An output passage of the amplifier 8 is connected to a further passage 12 arranged to issue fluid between the end of the plate 1 and a stationary plate or divider 13.

In the passage of the letters 7 over the plate 1, the letters achieve a vertical position determined by the balance between the fluid forces developed by the streams issuing from the apertures 2 and the gravitational force on the letters. If the letter is light, it rides high above the plate 1. In consequence, when the letter arrives over the aperture 2', the back pressure exerted on the air flowing from the aperture 2' is not great and only a relatively small pressure is developed in the passage 9. When a low pressure is maintained in the passage 9, the fluid supplied to the fluid amplifier 8 is directed primarily to the output passage 12. Thus, as a letter is transported to a location over the passage 12, the relatively intense flow of the air lifts the letter above the plate 13.

If, however, the letter 7 is heavy, it rides close to the plate 1 and impedes the flow of air from the aperture 2'. Pressure builds up in the passage 3' causing a pressure increase in the passage 9. The increase in pressure in passage 9 produces an increase in flow from nozzle 10 causing a large proportion of the flow from the power nozzle of the amplifier 8, which was previously directed to the passage 12, to be diverted from this passage. In consequence, the lifting effect on the letter 7 is small and the letter passes under the stationary plate 13.

It should be noted that the passage 12 may also be inclined upwardly toward the right of FIGURE 1 so as to provide left-to-right movement of the letter in this region.

By suitable adjustment of pressures and constrictions, the division point in weight can be adjusted as desired. More particularly, the amplifier 8 may have connected to a right control nozzle 15, a passage 14. The passage 14 may be provided with a valve 16 which adjusts the flow from its associated control nozzle to a specific value. This flow determined, in effect, the degree of resistance of the fluid to diversion from the output passage 12, and thus determined the particular weight of a letter at which the flow from the passage 12 is no longer sufficient to lift the letter above the plate 13. Thus, adjustment of the valve 16 allows the division weight to be selected as desired. The control nozzle 15 may be supplied from the common fluid source 4, as illustrated in FIGURE 6 or from another source at higher or lower pressure than source 4 if required for best operation of the particular amplifier 8 employed.

If a single fixed divider 13 is to be employed, it is preferable that the fluid amplifier 8 be a flip-flop type of device having two stable states. For such an amplifier, when the pressure in the passage 9 exceeds the lock-on forces of the stream plus the flow through the valve 16, the fluid is switched completely away from the passage 12 so that the letter drops well below the plate 13. If the pressure in the passage 9 is not sufficient to overcome the aforesaid forces, then all of the fluid remains switched to the passage 12 and the letter is lifted well above the passage 13. An analogue amplifier may be employed in this configuration, but is more applicable to the configuration of FIGURE 2 which provides a multiple sorting operation.

In the embodiment illustrated in FIGURE 2, which is only schematically illustrated, two divided plates 13' and 13" are employed. If the letter is light, most, if not all, of the fluid from the amplifier 8 flows to the output passage 12 and the letter is lifted above the plate 13. If the letter is somewhat heavier and produces an intermediate pressure in the passage 9, then, for instance, half of the fluid may be diverted from the passage 12. Such fluid flow may be made sufficient to maintain the height of the letter above the plate 13" but not great enough to raise it above the plate 13'. Thus, the letter would be sorted into the region between the two plates. If the letter is heavy and rides low, then substantially all of the fluid is diverted from the passage 12 and the letter drops below the plate 13". In this embodiment, if only weighing without sorting is desired, then the plates 13' and 13" may be disposed of and the output passages of the amplifier connected to a pressure measuring device to provide an indication of weight.

It should be noted that it is not essential to the practice of the present invention that light letters be moved above a plate and heavy letters permitted to go below a plate. By employing sufficient amplification in the fluid amplifier 8 and changing the interconnection of the passages 14 and 9, heavy letters will produce maximum flow to the passage 12 causing the letters to be raised above the plate, for instance plate 13 of FIGURE 1, whereas light letters will permit almost complete diversion of fluid from passage 12 and the light letters will pass under the plate 13.

It should be understood that, although in the specification reference has been made substantially throughout to the sorting of letters, the principles of the present invention are equally applicable to other types of sheet material and other objects which can be supported by streams of air.

While I have described and illustrated several specific embodiments of my invention, it will be clear that variation of the details of construction which are specifically illustrated and described may be resorted to without departing from the true spirit and scope of the invention as defined in the appended claims.

What I claim is:

1. An object positioning device comprising means for issuing streams of fluid for supporting an object, means for producing a signal indicative of the location of the object above the means for issuing and means responsive to said signal being in a specified range of magnitude for issuing a further stream of fluid of such flow parameters as to cause the object to have a predetermined vertical location relative to said means for issuing.

2. An object sorting device comprising means for issuing streams of fluid for supporting an object, means for producing a signal indicative of the location of the object above the means for issuing, structural means for defining a fixed height relative to said means for issuing, means for conveying an object toward and past said structural means and means responsive to said signal of said means for producing for issuing a further stream of fluid of such flow parameters as to cause the object to have a predetermined vertical location relative to said structural means.

3. An object sorting device comprising a base member, means for issuing streams of fluid through said base member of such a magnitude to support an object above said base member by a distance which is a function of weight of the object, means for producing a signal indicative of the location of the object above said base member, structural means for defining a fixed height relative to said base member, means for conveying the objects over said base member towards and past said structural means, and means responsive to said signal of means for producing for issuing a further stream of fluid between said base member and said structural means of such flow parameters as to cause the object to have a predetermined vertical position relative to said structural means.

4. An object sorting device comprising a base member, means for issuing streams of fluid through said base member for supporting an object above said base member by a distance which is a function of mass of the object, means for producing a fluid signal indicative of the location of the object above said base member, structural means for defining a fixed height relative to said base member, means for conveying the objects over said base member towards and past said structural means, a fluid amplifier having a control nozzle and an output passage for delivering fluid to a location between said base member and said structural means, and means responsive to said fluid signal for causing said control nozzle to issue fluid as a function of height of the object above said base member so as to vary the fluid flow to said output passage and thereby cause the object to have a predetermined vertical position relative to said structural means.

5. The combination according to claim 4 wherein said means for producing comprises means responsive to the pressure in one of said means for issuing streams of fluid.

6. An object weighing device comprising a plurality of passages, means connecting one end of each of said passages to a source of fluid pressure to cause fluid to issue from another end of each of said passages, the fluid streams having a flow rate such as to support an object to be weighed at a distance above said another end of said passages which distance is a function of weight of the object and flow rate of the streams, and means responsive to the pressure in at least one of said passages to produce a signal indicative of the weight of the object.

7. The combination according to claim 6 wherein said last mentioned means comprises a fluid amplifier including a power nozzle, a pair of output passages and at least one control nozzle, means for pressurizing said power nozzle to cause a stream of fluid to be issued toward said output passages, and means for connecting said control nozzle to said at least one of said plurality of passages.

8. An object weighing device comprising a plurality of passages, means connecting one end of each of said passages to a source of fluid pressure to cause fluid to issue from another end of each of said passages, the fluid streams having a flow rate such as to support an object to be weighed at a distance above said another end of said passages which is a function of weight of the object and flow rate of the streams, means for producing a signal indicative of the location of the object above the means for issuing and means responsive to said signal of said means for producing for issuing a further stream of fluid of such flow parameters as to cause the object to have a predetermined vertical location relative to said means for issuing.

9. An object weighing and sorting device comprising a base member, a plurality of passages extending through said base member, means connecting one end of each of said passages to a source of fluid pressure to cause fluid to issue from another end of each of said passages, the fluid streams having a flow rate such as to support an object to be weighed at a distance above said another end of said passages which is a function of weight of the object and flow rate of the streams, means for producing a signal indicative of the location of the object above said base member, structural means for separating objects above and below a predetermined weight, said structural means defining a fixed height relative to said base member, means for conveying the objects over said base member towards and past said structural means, and means responsive to said signal of said means for producing for issuing a further stream of fluid between said base member and said structural means of such flow parameters as to cause the object to have a predetermined vertical position relative to said structural means.

10. The combination according to claim 9 wherein said means for issuing a further stream of fluid comprises a fluid amplifier including a power nozzle, a pair of output passages and at least one control nozzle, means for pressurizing said power nozzle to cause a stream of fluid to be issued toward said output passages, one of said output passages issuing fluid between said base member and said structural means, and wherein said means for producing comprises means connecting said control nozzle to one of said plurality of passages.

11. The combination according to claim 9 wherein said means for conveying comprises inclining said passages through said base member in the desired direction of movement of the object.

12. An object sorting device comprising a sorting plate, means for issuing streams of fluid for supporting an object, means for conveying said object toward and past said sorting plate, means for producing a signal indicative of the location of the object above the means for issuing and means responsive to said signal being in a specified range of magnitudes for issuing a further stream of fluid of such flow parameters as to cause the object to have a predetermined vertical location relative to said sorting plate.

References Cited by the Examiner
UNITED STATES PATENTS

| | | | |
|---|---|---|---|
| 2,552,189 | 5/1951 | Kuehni | 73—144 |
| 3,169,639 | 2/1965 | Bauer | 235—201 X |
| 3,220,550 | 11/1965 | Gilbert | 209—120 |

M. HENSON WOOD, JR., *Primary Examiner.*

R. A. SCHACHER, *Assistant Examiner.*